Walton J. Greer, INVENTOR.
BY
Earl Babcock,
ATTORNEY.

Oct. 30, 1951     W. J. GREER     2,573,133
WELL LOGGING SYSTEM

Filed Aug. 13, 1948     4 Sheets-Sheet 3

Walton J. Greer, INVENTOR.
BY
Earl Babcock,
ATTORNEY.

Oct. 30, 1951 W. J. GREER 2,573,133
WELL LOGGING SYSTEM
Filed Aug. 13, 1948 4 Sheets—Sheet 4

Walton J. Greer, INVENTOR.
BY
Earl Babcock
ATTORNEY.

Patented Oct. 30, 1951

2,573,133

UNITED STATES PATENT OFFICE 2,573,133

WELL LOGGING SYSTEM

Walton J. Greer, Houston, Tex., assignor to Halliburton Oil Well Cementing Company, Duncan, Okla.

Application August 13, 1948, Serial No. 44,149

6 Claims. (Cl. 175—182)

This invention relates to the electrical logging of oil wells and more particularly to an arrangement for making a number of electric logs simultaneously.

It has heretofore commonly been the practice, in the electrical logging of oil wells, to make a natural potential curve and a so-called resistivity curve at the same time. If additional resistivity curves were wanted, it has been necessary either to use a cable with a large number of conductors or make the curves one after the other. The use of a multiple conductor cable is difficult and expensive. The making of curves one after the other introduces errors in correlation as to depth, due to stretching of the cable or other causes. It has been desirable for many years to find a system which can make a number of resistivity curves at the same time and still use a single conductor cable or at least one having only a few conductors.

In acordance with the present invention it is proposed to provide equipment which will make it possible to run several resistivity curves simultaneously on a single conductor cable. To accomplish this end, a novel electrical transmission system has been devised which employs the frequency modulation of several carrier frequencies in accordance with the amplitudes of the potentials coming from different electrodes in the bore hole.

It has heretofore been suggested that an electrical system using frequency modulation might be used for the transmission of intelligence from a point in a bore hole to the surface of the ground, although it is believed that such a system has not heretofore been actually reduced to practice. Since frequency modulation is now well known in other applications of electricity, broadly there is probably no invention in using it in this art. At any rate, no claim is made that the present invention is pioneer in that respect. But, as part of the present invention, certain systems and circuits have been designed to meet certain problems and conditions, particularly those which make it difficult to transmit intelligence through a well bore to make several resistivity curves at the same time, and these systems or circuits are claimed.

Known frequency modulation circuits, such as now commonly used in radio transmission of intelligence use high frequency signals. Insofar as practical considerations apply, such high frequencies cannot be used in a well bore however. Experience with alternating current electrical logging systems has shown that conditions in a well bore are such as to make the use of a relatively low frequency desirable. As much power as possible should be supplied to the electrodes in making a resistivity curve and the capacitance of an ordinary electrical cable suitable for carrying high current is such that if higher frequency is used, attenuation becomes so great that the system is not practicable.

Under the present invention, a number of alternating current potentials may be picked up and measured while alternating current is being supplied to the earth formations. For example, six electrodes may be placed in the bore hole, two current electrodes and four pick-up electrodes. By pairing or combining certain of the pick-up electrodes selectively, it is possible to make several resistivity logs at the same time. As an example, alternating current of 400 or 500 cycles frequency may be impressed upon the current electrodes, and three resistivity logs obtained, each log being dependent upon the alternating current potential of the particular configuration or spacing of its pick-up electrodes. At the same time one of the pick-up electrodes may be used to make a natural earth potential log of the bore hole, which, as is well known, is a log of variations in direct current potential.

In accordance with the present invention, the alternating current potentials picked up by the various pick-up electrodes in making the resistivity curves vary in accordance with or dependence upon the changes in resistivity of the earth formations along the bore hole. This produces alternating current potentials the frequency of which is the same as that of the alternating current transmitted down the cable from the surface of the ground and impressed upon the current electrodes. These potentials are then converted, by a special and novel circuit, into frequency modulated signals. To this end, a number of oscillators are provided in the electrode assembly lowered into the bore hole and each of the incoming alternating current potentials is used to frequency modulate its particular oscillator.

Each oscillator has its own carrier frequency band so that the signals are kept separate. Each frequency modulated carrier current is passed through a buffer amplifier which raises the signal level and prevents signals of each oscillator from interfering with the others. It is then impressed upon the conductor of the cable and transmitted to the surface of the ground. At the surface, the signals are selectively filtered and measured.

Accordingly it is one object of the invention to devise a novel system for electrically logging oil wells involving the conversion of alternating current pick-up electrode potentials into frequency modulated signals which are transmitted to the surface of the ground and measured for the purpose of determining conditions in a bore hole.

It is another object of the invention to devise a novel system of frequency modulation suitable for use in transmitting intelligence through a cable from points in a bore hole to the surface of the ground while power is being transmitted down the cable to supply equipment in the bore hole.

Other objects and advantages reside in certain novel features of the arrangement and combination of elements in the system as will be more apparent from the following description taken in connection with the accompanying drawings in which.

Figure 1:
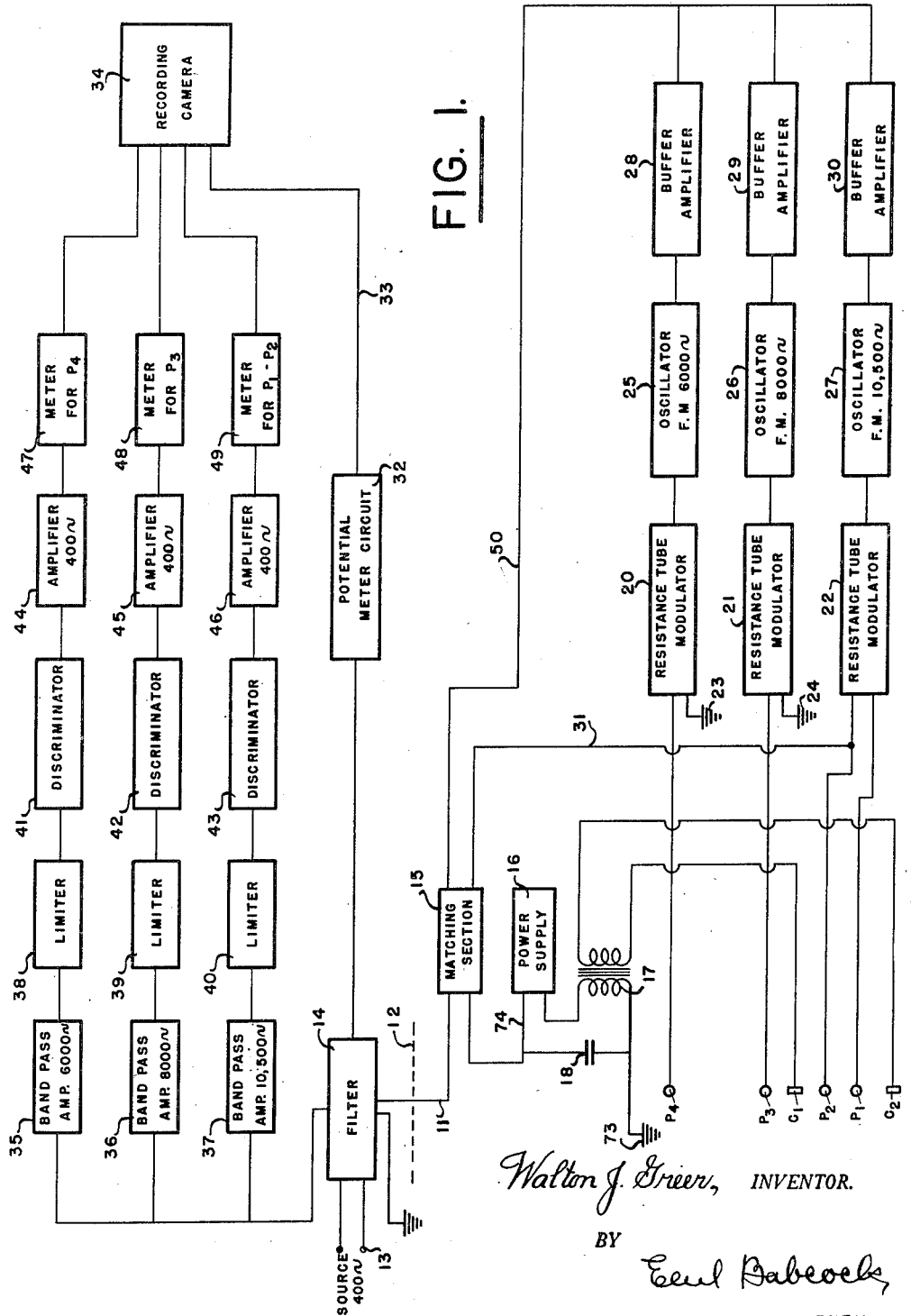
Fig. 1 is a diagrammatic representation of an entire logging system constructed in accordance with the invention, with the various parts shown only roughly as rectangles but illustrating how the various parts are arranged within the system.

Referring to the drawing in detail and first to the arrangement shown in Fig. 1, it will be seen that the system illustrated includes a number of electrical devices connected together to form an electrical logging system. While the invention is not limited to the use of a single conductor cable, it will be shown and described in connection with such a cable. Thus the single line designated 11 in Fig. 1 represents the conductor of a cable. The portion of the system above the dashed line 12 on the conductor 11 represents equipment at the surface of the ground, while the equipment below the dashed line 12 represents equipment in the "electrode assembly" which is lowered into the bore hole in the making of an electric log.

As shown, the equipment lowered into the bore hole includes a number of electrodes, these being designated $C_1$, $C_2$, and $P_1$, $P_2$, $P_3$, and $P_4$. The electrodes $C_1$ and $C_2$ are represented, for convenience, as rectangles, while the electrodes $P_1$, $P_2$, $P_3$, and $P_4$ are shown as small circles. The electrodes $C_1$ and $C_2$ are current electrodes used to cause an alternating current to flow through mud in the well bore and through the earth formations around it. Electrodes $P_1$, $P_2$, $P_3$, and $P_4$ are pick-up electrodes used for determining the potential drop in the bore hole caused by the passage of current between electrodes $C_1$ and $C_2$. One of the electrodes, as for example the electrode $P_2$, may also be used to measure natural earth potentials as will appear from the description hereinafter.

The electrode configuration is such that several resistivity curves may be made simultaneously with a natural potential curve. The kind of resistivity curve, that is, whether it is a single electrode curve, a two electrode curve, a three electrode curve or a four electrode curve, as these terms are used in the art, and also the spacing between the electrodes may be selected as desired. For purposes of illustration, the system herein described in addition to making a natural potential curve, makes the following: (1) a short spaced four electrode resistivity curve, the potential of which is that existing across pick-up electrodes $P_1$ and $P_2$ located in between current electrodes $C_1$ and $C_2$; (2) a medium spaced three electrode resistivity curve, the potential of which is that existing between pick-up electrode $P_3$ and the ground at the surface or on the sheath of the cable or other remote point; and (3) a long spaced three electrode resistivity curve, the potential of which is that existing between pick-up electrode $P_4$ and the ground such as at the surface. The current electrodes may be three feet apart; the electrodes $P_1$ and $P_2$, six inches apart and symmetrical with respect to $C_1$ and $C_2$; the electrode $P_3$, six feet from the nearest current electrode $C_1$; and the electrode $P_4$, twenty-five feet from $C_1$. For discussion of these and other electrode configurations which may be used, see article by Guyod in the "Oil Weekly" August 7 to December 4, 1944.

At the surface of the ground the system of Fig. 1 includes a source of alternating current designated 13. This may have a frequency of 400 cycles as indicated. None of the power from the source 13 is used to operate the surface equipment. (The source or sources for the surface equipment are standard and not shown in the drawing.) All of the power from source 13 is sent down the cable 11 into the bore hole to cause current to flow between the current electrodes $C_1$ and $C_2$ and to supply power for the oscillatory tubes and other equipment in the electrode assembly.

The circuit for source 13 includes a filter arrangement 14, the purpose of which is to keep current from it out of the recording system and out of the potential meter. One terminal of the source 13 is grounded at this point while the other terminal is connected to the conductor 11. The circuit of conductor 11 includes the matching section designated 15, the purpose of which is to impress upon the conductor 11 of the cable the signals which result from the alternating current potentials on pick-up electrodes in the well bore as will be explained later. The matching section does not in any way affect the current from source 13 as it passes downwardly to the formation transformer 17. The circuit for the source 13 also includes a power supply 16, the purpose of which is to convert some of the energy from the source 13 into voltages suitable for operating the vacuum tubes and other equipment in the electrode assembly. From the power supply 16, current from the source 13 passes through the primary of transformer 17 and then to ground. A condenser 18 may be located across the power supply 16 and the primary of transformer 17 to furnish a bypass for the channel frequencies around the power supply 16 and the formation transformer 17. The secondary of the transformer 17 is connected directly to the current electrodes $C_1$ and $C_2$.

Since the current impressed upon the current electrodes $C_1$ and $C_2$ is 400-cycle alternating current the potential picked up by the pick-up electrodes is also of 400-cycle frequency. Variations in resistivity of the earth formations cause differences in alternating current potential existing at various points in the vicinity of the current electrodes $C_1$ and $C_2$. As mentioned above, the system shown in Fig. 1 is arranged to make three resistivity curves. Accordingly, there are three signal receiving circuits, one for each resistivity curve. In the arrangement herein described, each consists of a resistance tube modulator. These are designated 20, 21 and 22. One input terminal of resistance tube modulator 20 is connected to pick-up electrode $P_4$ while the other is grounded as shown at 23. (All grounds in the bore hole may be effected by means of the sheath on the cable or by connecting to a remote electrode.) Likewise one input terminal of resistance tube modulator 21 is connected to pick-up electrode $P_3$ while the other is grounded as shown at 24. Resistance tube modulator 22 is connected to the pick-up electrodes $P_1$ and $P_2$; and hence, there is no ground upon it.

The purpose of each signal receiving circuit or resistance tube modulator is to convert changes in alternating current potential impressed upon it from the pick-up electrodes into corresponding changes in resistance. By means which will presently be described in detail, these changes in resistance are employed to modulate the frequencies of carrier waves of three oscillators. These oscillators are designated 25, 26, and 27 in Fig. 1 and each has its own frequency band. For example, oscillator 25 connected to resistance tube modulator 20 may have an unmodulated carrier frequency of 6,000 cycles per second; oscillator 26 connected to resistance tube modulator 21 may have an unmodulated carrier frequency of 8,000 cycles per second; and oscillator 27 connected to resistance tube modulator 22 may have an unmodulated carrier frequency of 10,500 cycles per second.

The output from each oscillator must be amplified. At the same time, the oscillators must not interfere with each other. Hence each oscillator is provided with a buffer amplifier and these are designated 28, 29, and 30. As used herein, a "buffer" amplifier is one which serves to amplify its own signal in a network while preventing any other signals from being fed back through it.

The total signal output from the three buffer amplifiers, which is of course, the result of the frequency modulation of all three of the oscillators 25, 26, and 27, is fed into the matching section 15 mentioned above which serves the purpose of impressing all of the signals upon the conductor 11 of the cable.

The natural earth potential may be impressed upon the conductor 11 of the cable from any one of the pick-up electrodes in the bore hole. In the arrangement shown in Fig. 1, a conductor 31 is shown connecting the pick-up electrode $P_2$ directly to the matching section 15. This natural earth potential is impressed on the conductor 11 of the cable through the matching section 15 and is taken from the conductor 11 in the primary filter 14 at the surface of the ground. It may be fed through a potential meter circuit 32 and a conductor 33 directly to a recording camera 34.

It is within the purview of the present invention to convert in the bore hole, the natural potential into an alternating current and impress it upon an oscillator in the electrode assembly to modulate the frequency thereof, but inasmuch as this will be obvious from a consideration of the particular circuits hereinafter described for the making of resistivity curves, it is not shown in Fig. 1. It is worth mentioning, however, since such a system might make a very excellent potential curve and be free from some of the "noise" now commonly experienced in making potential curves, the "noise" being caused by magnetic changes or other variations in the cable or equipment.

On the other hand the present invention is capable of making resistivity curves simultaneously with the making of a conventional potential curve. Hence a detailed discussion of a special potential curve circuit is not necessary. In Fig. 1, the natural earth potential is passed up the conductor 11 of the cable as a direct current and measured by a circuit similar to that now commonly used for this purpose.

As to the resistivity signals, that is, the three frequency modulated signals passing up through the conductor 11 of the cable, all are separated from the D. C. natural potential signal in the filter 14. In order to separately measure these signals they must then be separated from each other. To this end suitable band pass amplifiers are provided, these being designated 35, 36, and 37.

Each of the band pass amplifiers 35, 36, and 37 contains a band pass filter circuit and each is designed to pass one of the carrier frequencies, with the variations thereon which constitute the signal, set up by the oscillators 25, 26, and 27 in the well bore. Of course, this invention is not limited to the employment of the particular frequency bands illustrated, but since for purposes of illustration, carrier or "central" frequencies of 6,000 cycles, 8,000 cycles and 10,500 cycles were indicated for the oscillators 25, 26, and 27, respectively, so likewise the band pass amplifiers 35, 36, and 37 are indicated as passing 6,000, 8,000 and 10,500 cycles.

The output of the band pass amplifiers, which carry the three signals are passed through devices known as limiters. These are designated 38, 39, and 40. Their purpose is to remove some causes of error as will be explained hereinafter in connection with the diagrams of Figs. 7, 8, and 9. The outputs of the limiters are fed to devices known as discriminators, designated 41, 42, and 43. These discriminators may be of that type commonly used in frequency modulation radio reception. Their purpose is to demodulate the frequency modulated signals into amplitude modulated alternating current signals, corresponding to that at the pick-up electrodes.

The outputs from the discriminators 41, 42, and 43 may be amplified by band pass amplifiers 44, 45, and 46. Outputs from the amplifiers are impressed upon suitable meter circuits such as those designated 47, 48, and 49 and then fed into the recording camera 34, where the logs or curves are made.

All of the equipment and circuits used at the surface of the ground for carrying out the present invention is well known to those skilled in the art. Hence, it is believed to be unnecessary to describe the circuits in further detail in this specification. The equipment and circuits employed in the electrode assembly require further explanation, however.

Figure 2:
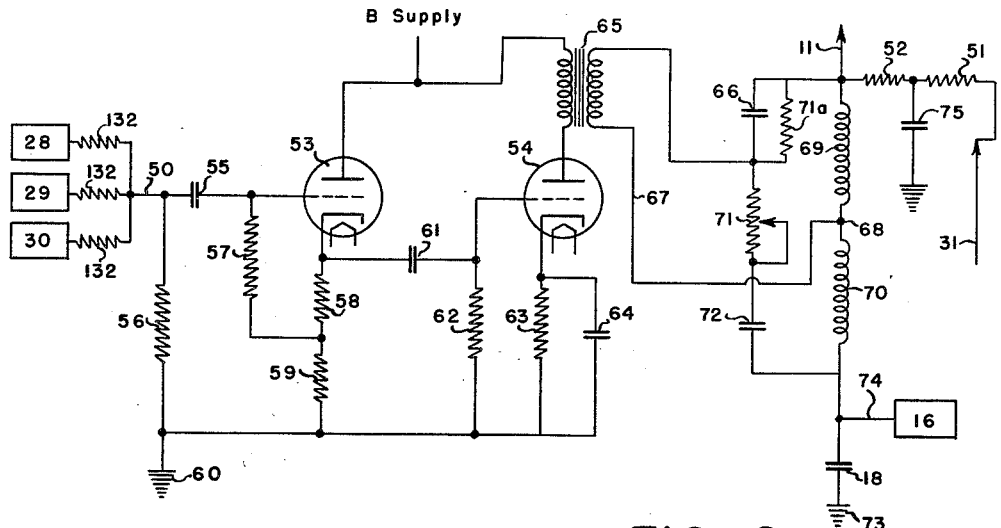
Fig. 2 is a circuit diagram of the matching section of the system of Fig. 1.

The circuit of the matching section 15 of Fig. 1 is shown in Fig. 2. As explained above, this matching section serves to impress three frequency modulated signals (the resistivity signals) and one direct current signal (the natural potential signal) upon the conductor 11 of the cable. As shown in Fig. 1, these signals come to the matching section 15 through two conductors designated 31 and 50 and these are similarly designated in Fig. 2. The natural potential signal passes through two resistors 51 and 52 and is then fed directly to the conductor 11.

The frequency modulated signals from the buffer amplifiers 28, 29, and 30 (shown at the left of Fig. 2) come over the conductor 50 to the input side of a resistance coupled vacuum tube circuit which includes two triodes 53 and 54. Resistor 56 and resistors 132 in the outputs of the buffer amplifiers 28, 29, and 30 form a voltage divider network to insure the proper level of signal in the grid of tube 53. Condenser 55 couples the incoming signals to the grid of tube 53.

Tube 53 is connected in a conventional cathode follower circuit with resistor 57 constituting the grid resistor, and resistances 58 and 59 make up the load resistance between the cathode and ground 60. The potential at the point between resistances 58 and 59 determines the operating grid bias level of the circuit. Condenser 61 and resistance 62 constitute the coupling network into the grid of tube 54 which is connected in a conventional power amplifier circuit. Resistor 63 is a cathode self-biasing resistor and condenser 64 acts as an alternating current by-pass for it. Output transformer 65 connects this power output stage to the coupling arrangement made up of inductances 69 and 70 and capacitances 66 and 72 and resistors 71 and 71$a$. These elements are so connected as to form a bridge network balanced at 400 cycles, so that the carrier frequencies can be impressed onto the conductor but 400 cycle current from the power source cannot be fed into the power output stage. Resistors 51 and 52 and condenser 75 constitute a low pass filter to pass the direct current natural potential from line 31 to the conductor 11, at the same time preventing alternating current from the conductor 11 passing through the line 31.

Figure 3:
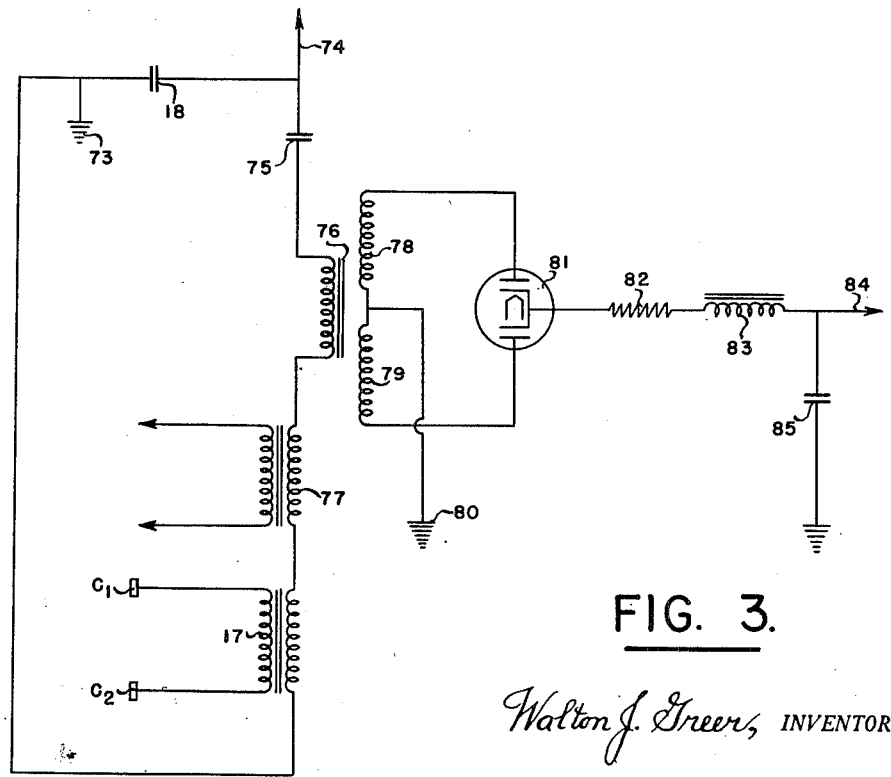
Fig. 3 is a circuit diagram of the power supply of the system of Fig. 1.

Fig. 3 is a circuit diagram of the power supply section 16 of Fig. 1. Power from the source 13 at the surface of the ground comes down the conductor 11 and after passing through the coils 69 and 70 of the matching section 15 shown in Fig. 2 enters the power supply section 16 through the conductor 74 (Fig. 3). In series between the conductor 74 and the ground 73 are the primaries of three transformers 76, 77, and 17. The secondary of transformer 17 is connected to the current electrodes C$_1$ and C$_2$ (as also shown in Fig. 1). The transformer 77 affords a source of filament supply for the vacuum tubes in the electrode assembly and the transformer 76 affords a source for the "B" supply of the tubes. The circuit of the latter includes two secondaries 78 and 79, the midpoint of which is grounded at 80 and the outer terminals of which are connected to the plates of a rectifier tube 81. The cathode of the tube 81 is connected to the "B" supply of the tubes through a ripple filter section made up of resistor 82, choke 83 and condenser 85.

Figure 4:
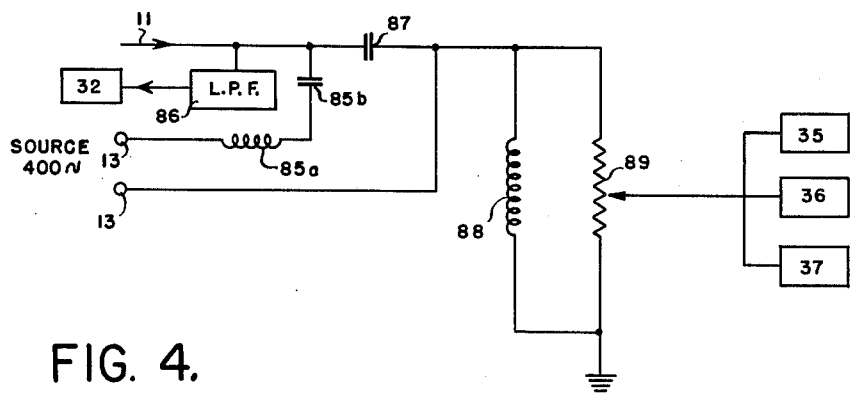
Fig. 4 is a circuit diagram of the filter used in the system of Fig. 1.

In Fig. 4 the circuit of the filter 14 is shown. This filter serves to prevent the 400-cycle source from passing into the band pass amplifiers 35, 36, and 37 of Fig. 1 and at the same time separates the direct current natural potential signal from the frequency modulated resistivity signals. Choke 85$a$ and condenser 85$b$ constitute a series circuit tuned to 400 cycles. The purpose of this circuit is to pass the 400 cycles but to block the direct current natural potential. Thus the direct current signal is not grounded through the 400-cycle source. The natural earth potential signal passes from conductor 11 through the low pass filter 86 directly to the potential meter circuit 32 as shown in Fig. 4 and also in Fig. 1. Condenser 87 is also a blocking condenser. It is used to prevent the direct current natural potential from being grounded through the inductance 88. The values of condenser 87 and inductance 88 are so selected to pass the carrier frequencies but to attenuate the 400-cycle power source frequency. Potentiometer 89 serves as a voltage divider to regulate the value of the signals fed to the band pass amplifiers 35, 36, and 37.

Figure 5:
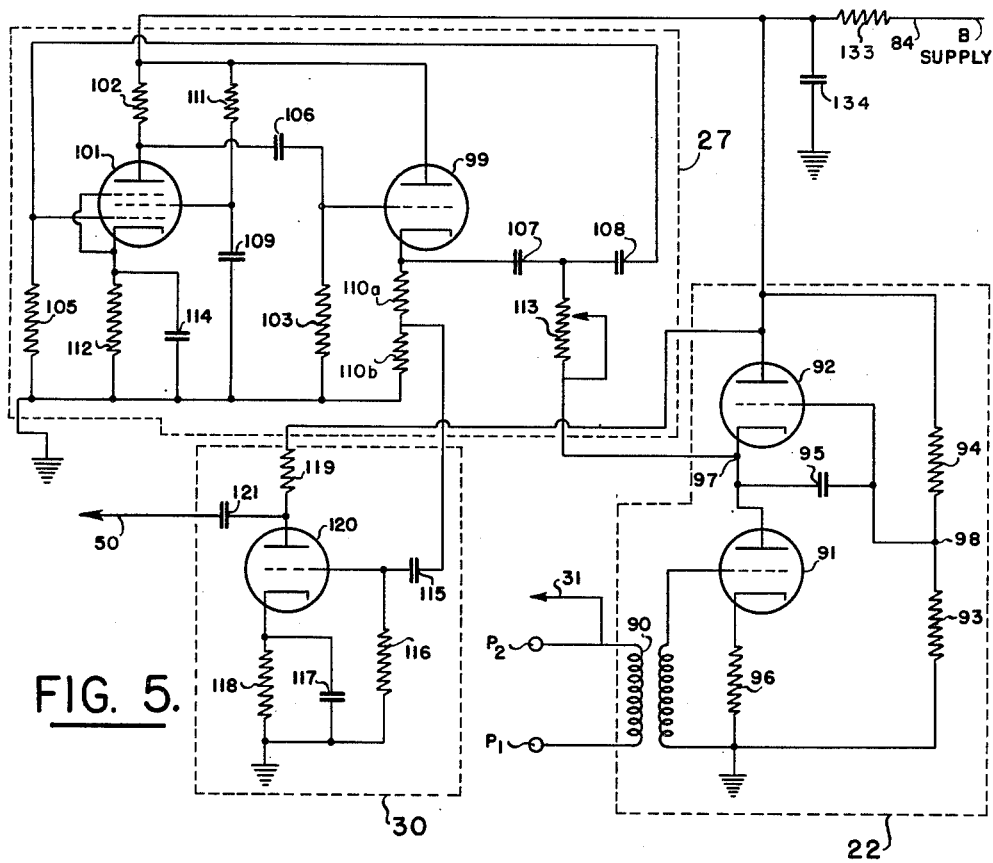
Fig. 5 is a circuit diagram of a unit including one resistance tube modulator, one oscillator and one buffer amplifier used in the system of Fig. 1, it being understood that there are three such units in the system of Fig. 1, each operating at a different frequency range.

Fig. 5 is a circuit diagram of one of the three "units" for converting 400 cycle potentials into frequency modulated signals. The unit selected for illustration is that which consists of the resistance tube modulator 22, the oscillator 27 and the buffer amplifier 30 of the system shown in Fig. 1. These parts are enclosed in dotted lines in Fig. 5. In other words, this is a circuit diagram for converting the alternating current potential existing across the pick-up electrodes P$_1$ and P$_2$ into a frequency modulated signal which is then supplied to the matching section 15 as already described. It will be understood that the signals from the other pick-up electrodes P$_3$ and P$_4$ are handled in a similar manner and each need not be described in detail.

In Fig. 5, the pick-up electrodes P$_1$ and P$_2$ are shown and it will be clear that the alternating current potential across them is the input to the system shown in this figure. The output is the conductor 50. There is no direct current signal potential in conductor 50, the natural earth potential being fed directly to the matching section by conductor 31 as explained above.

The signal from the pick-up electrodes P$_1$ and P$_2$ is fed to the primary of a transformer 90, the secondary of which is connected, on one side, to the grid of a triode 91 and on the other side to ground. The plate of triode 91 is connected to the cathode of another triode 92. Two resistors 93 and 94 are connected in series between ground and the plate of triode 92 while a condenser 95 is connected between the terminal 97 at the cathode of triode 92 and the midpoint 98 between the resistors 93 and 94. The terminal 97 might be said to be the output or control point of the resistance tube modulator circuit (the parts designated 90 to 98 respectively). This modulator circuit forms part of a ladder network system associated with the oscillator and controlled from point 97.

In the oscillator system, there are two tubes designated 99 and 101. A resistor 102 is connected between the plate of tube 101 and the source of "B" supply coming into the system over the conductor 84. Resistors 103, 105, 110, 111, 112, and 113 are connected into the circuit as illustrated and are associated in the particular way shown with condensers 106, 107, 108, 109, and 114.

The output of the oscillator system is taken from the point between the resistors 110a and 110b. The signal is fed to the grid of a triode 120 of the buffer amplifier system 30. The buffer amplifier circuit includes condensers 115, 117 and 121 and resistors 116, 118, 119, and 132 connected as shown.

Figure 10:
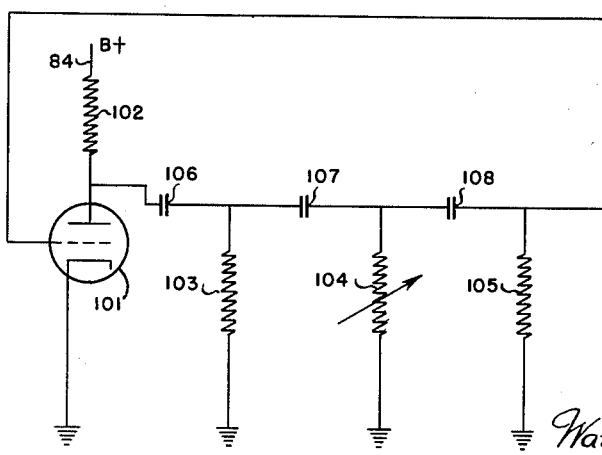
Fig. 10 is a circuit diagram of a 180° phase shift oscillator utilizing a "ladder" network, which is old in the art, but included herein for purposes of clarity in explaining the present invention.

In order to explain the system of Fig. 5, reference will be had to Fig. 10 which illustrates the basic principles of an oscillator using a ladder network and, which is commonly known as 180° phase-shift oscillator. The principle of operation involves the use of an amplifier tube, the desired frequency output of which is shifted 180° in phase and fed back into the grid of the same tube. This phase shift is brought about by a ladder network of capacitors 106, 107, and 108 and resistors 103, 104, and 105. If the gain of the amplifier tube is sufficient, this arrangement will constitute an oscillator, the natural frequency of which is determined by the constants of the ladder network. Changing the value of any of the elements in this ladder network will change the frequency of oscillation of the circuit. In Fig. 10, the parts similar to those of Fig. 5 are similarly deisgnated. In addition there is shown a variable resistor 104.

The constants in the circuit of Fig. 10 may be so selected that through three steps the 10,500-cycle sine wave (selected for purposes of illustration in connection with Fig. 5) will be shifted 180° in phase. Thus, the oscillator as shown in Fig. 10 will continue operation at a fixed frequency of 10,500 unless some element of the ladder is changed. Now, if a change is made in any one element, such as resistor 104, in any way, up or down, the frequency of the oscillator is caused to shift accordingly. If the resistance is lowered the natural frequency of oscillation is raised. If the resistance is increased the natural frequency of oscillation is lowered.

If for the resistance 104 in Fig. 10, a substitution of the resistance tube modulator 22 of Fig. 5 is made and if the resistance tube modulator circuit is caused to vary in resistance depending upon the incoming alternating current potentials from the pick-up electrodes $P_1$ and $P_2$, the amplitude of the potentials on $P_1$ and $P_2$ is changed to a frequency modulated signal in the circuit of the vacuum tube 101 of Fig. 5. Hence, the purpose of the resistance tube modulator is to cause a change in reistance of one leg of the ladder network of Fig. 5 in proportion to the alternating current potential coming in from $P_1$ and $P_2$. This is brought about in the resistance tube modulator as follows:

The effective dynamic resistance of a vacuum tube between the plate and cathode is proportional, among other things, to the value of the potential on its grid. In this particular circuit two tubes 91 and 92 are used in such a way as to prevent the incoming signal from being applied to the ladder network as potential changes. If two tubes were not used, a single tube 91 could be used with a fixed resistor taking the place of tube 92. Thus, this circuit could operate with only one tube, though not as well. The principle of the two-tube resistance arrangement is as follows: The resistance of tube 91 is varied as described above. The grid of tube 92 is held at some fixed value by the divider network resistance 93 and 94. Now, when the resistance of tube 91 is changed, let us say reduced, then the voltage at the plate of that tube will be reduced. This will carry the cathode potential of tube 92 downward. As said before, the grid of this tube 92 is held constant. So, in effect there has been a positive signal put between the grid and cathode of tube 92 which in turn reduces its resistance. The reduction of the resistance of this tube equals that of tube 91 so that the dividing atcion between the B+ supply and ground level as far as seen at point 97 remains constant so that no voltage change has been introduced at this point which would reflect into the ladder network, although the effective resistance between this point and ground has varied in accordance with the signal put into the grid of tube 91. This variation in resistance between point 97 and ground is in exact accordance with the amplitude of the signal coming from electrodes $P_1$ and $P_2$. This eventually results in a modulation of the frequency of the oscillator in exact accordance with this change in resistance which in turn is in accordance with the change in amplitude of the input signal from electrodes $P_1$ and $P_2$. Resistor 96 is a cathode biasing resistor to insure the proper operating bias level for the tube 91. There is no such resistor in the circuit of tube 92, the bias being taken care of by the potential at the point between resistor 93 and resistor 94, which is point 98. The circuit of tube 99 located between the first and second ladder elements is that of a cathode follower The purpose of this cathode follower is to isolate from the oscillator tube 101 the varying load of that section of the ladder network made up of the resistance tube modulator plus the third section of the ladder made up of capacitor 108 and resistor 105. By employing the cathode follower the oscillator tube is completely isolated from the varying portion of the ladder and so is not affected by any changes in the loading on this tube. In other words, there is no varying load on tube 101. Resistor 111 is a potential dropping resistor for the screen grid of tube 101. Condenser 109 is a screen grid by-pass condenser. Condenser 114 is a cathode by-pass condenser. Resistor 133 and condenser 134 constitute a decoupling network on the plate supply to this oscillator circuit.

The circuit of tube 120 is that of a straight amplifier. Condenser 115 is a coupling condenser between the oscillator and the buffer amplifier. Resistor 116 is a grid return resistor. Resistor 118 is a cathode bias resistor for the tube 120. Condenser 117 is a cathode by-pass condenser. Resistor 119 is the load resistor for the tube 120. Condenser 121 is a blocking condenser to keep the B+ potential out of the output circuit.

Figures 6, 7:
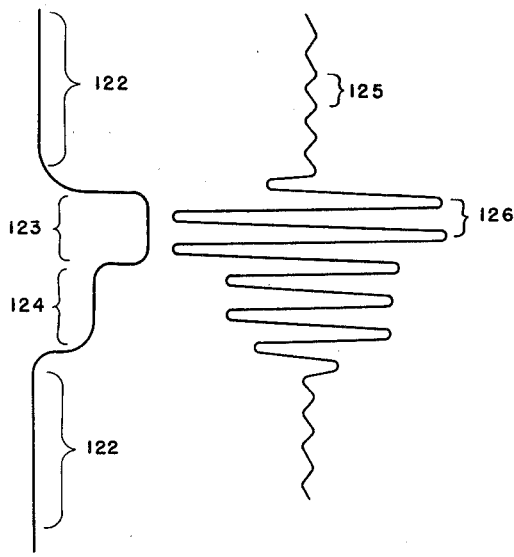
Fig. 6 is a simulated diagrammatic representation of an ordinary resistivity log showing two deflections thereon.
Fig. 7 is a simulated diagrammatic representation of an alternating current potential responsive to the changes in resistivity on the log of Fig. 6.
Figure 8:
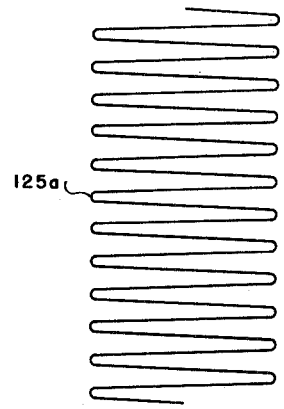
Fig. 8 is a simulated diagrammatic representation of the output of an oscillator which is not frequency modulated.
Figure 9:
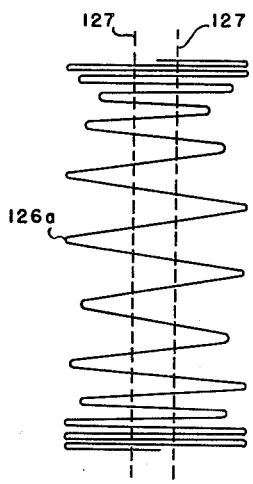
Fig. 9 is a simulated diagrammatic representation of the output of the oscillator of Fig. 8 showing the effects of frequency modulation thereon when the amplitude modulation of Fig. 7 is caused to vary it in accordance with the present invention.

The diagrams of Figs. 6, 7, 8, and 9 illustrate what happens in converting the 400 cycle alternating current potential across electrodes $P_1$ and $P_2$ into a frequency modulated signal. Fig. 6 is a chart with apparent resistivity plotted against depth in a bore hole. Figs. 7, 8, and 9 are charts with potential plotted as abscissae and time as ordinates.

Fig. 6 shows three variations in apparent resistivity along a bore hole.

The portions 122 represent low resistivity, the portion 123 a large resistivity or "kick" and the portion 124 a medium resistivity or kick.

When the electrodes $C_1$ and $C_2$ are moved past such a section of the bore hole as illustrated in Fig. 6, the alternating current potential across the pick-up electrodes behaves somewhat like that illustrated in Fig. 7. This illustrates a 400 cycle alternating current potential, the amplitude of the waves being proportional to the variations in apparent resistivity in the curve of Fig. 6. The amplitude remains small when the pick-up electrodes are passing the portions of the bore hole illustrated at 122 in Fig. 6. The amplitude is larger when the pick-up electrodes pass the portion 124 of Fig. 6 and still larger when the pick-up electrodes pass the portion 123.

Fig. 7 thus represents the alternating current potentials impressed upon the resistance tube modulator 22 of Figs. 1 and 5. The resistance tube modulator converts these potentials into changes in resistance as explained above and modulates the ladder network of the oscillator 27. Since the oscillator 27 is operating at a much higher frequency (10,500 cycles in the example given) than the 400 cycle potential impressed upon the resistance tube modulator 22, it is not practicable to illustrate in Figs. 8 and 9 all of the changes in potential level represented in Fig. 7, so only two have been selected. One complete wave 125 of low strength 400 cycle signal potential of Fig. 7 is translated into the frequency modulated signal of Fig. 8 and one complete wave 126 of high strength 400 cycle signal potential of Fig. 7 is translated into the frequency modulated signal of Fig. 9. The wave 125 represents practically zero signal potential. Hence the carrier waves 125a of Fig. 8 shows no appreciable frequency modulation. The adjustments of the system are such that the frequency remains at 10,500 when there is zero resistivity of the earth formation. Now when any changes in resistivity of the earth formation occur, as illustrated at 123 in Fig. 6, the amplitude of each wave of alternating current potential changes as shown at 126 in Fig. 7 and each wave of this 400 cycle potential disturbs the regularity of the frequency of the carrier wave of the oscillator 27 as illustrated at 126a in Fig. 9. The entire Fig. 9 represents the effects of one wave 126 of potential of Fig. 7. The ordinate length of Fig. 8 is the same as that of Fig. 9 and represents the same interval of time. There are the same number of waves in Fig. 9 that there are in Fig. 8, but some are bunched and some spread in Fig. 9 due to the effects of the wave 126 upon the carrier waves.

There is thus illustrated a system in which resistivity variations in earth formations (as represented in Fig. 6), cause variations in the amplitude of the waves of an alternating current potential (as represented in Fig. 7), which in turn cause variations in a resistance element which modulates the frequency of the carrier waves of an oscillator very little (as represented in Fig. 8), if the resistivity variations in the earth are small or a great deal (as represented in Fig. 9), if the resistivity variations in the earth are large, with the total number of carrier waves per second of the oscillator remaining substantially constant (10,500 in the example given).

The dashed lines 127 of Fig. 9 represent the action of the limiter 40 of Fig. 1. It will be observed that the waves of Fig. 9 do not have regular amplitude. The variations in amplitude adversely affect the accuracy of the measurements unless eliminated. The limiter performs this function as is well known in the art.

By means of the system illustrated, all effects of variations in resistance of the cable due to bending or stretching or due to changes in temperature or other causes have no effect whatever on the readings of resistivity. The recordings are of truly high fidelity. Many features of the invention are applicable to natural potential logging, radioactive logging, temperature logging or caliper logging of oil wells as well as to the resistivity logging described. Many modifications in details of the system will readily be apparent to those skilled in the art. The system herein described is intended to serve only as an illustration of one embodiment of the invention. Various changes may be made without departing from the spirit of the invention or the scope of the annexed claims.

I claim:

1. In an electrical system for making a plurality of resistivity logs of an oil well or the like simultaneously, in which electrodes are lowered into a bore hole on an electrical cable, alternating current is sent down the cable from a source at the surface of the ground to current electrodes to cause alternating current to flow through fluid in the bore hole and through earth formations around the bore hole and signals are transmitted up the cable to measuring apparatus at the surface, the combination with a plurality of pick-up electrodes in the bore hole of a plurality of units for converting the alternating current potentials impressed upon said pick-up electrodes by the flow of alternating current between the current electrodes into frequency modulated signals, each of said units consisting of a resistance tube modulator circuit for converting changes in alternating current potential into changes in resistance, and an oscillator circuit for converting changes in resistance into frequency modulations on a carrier wave, said oscillator circuit being connected to said resistance tube modulator circuit whereby the latter modulates the frequency of oscillation of said oscillator circuit.

2. In an electrical system for making a natural potential log and a plurality of resistivity logs of an oil well or the like simultaneously, in which electrodes are lowered into a bore hole on a single conductor electrical cable, power is sent down the cable from an alternating current source at the surface of the ground to cause current to flow through fluid in the bore hole and through earth formations and signals indicative of the natural earth potential and of the resistivity of the formations are transmitted up the cable to measuring apparatus at the surface, the combination with a plurality of pick-up electrodes in the bore hole of a matching section for impressing all of said signals upon the conductor of the cable and a plurality of units for converting the alternating current potentials impressed upon certain of said pick-up electrodes by the flow of current into frequency modulated signals, each of said units having an input from one or more of said pick-up electrodes and having an output into said matching section and each of said units consisting of a signal receiving circuit for converting changes in alternating current potential into changes in resistance, an oscillator circuit for generating carrier waves connected to said signal receiving circuit and a buffer amplifier connected to said oscillator circuit and said matching section, the arrangement being such that the changes in resistance of said signal receiving circuit modulate the frequency of the carrier waves of said oscillator circuit.

3. In an electrical system for making simultaneously a natural potential log and a plurality of resistivity logs, having different electrode spacing, of earth formations along a bore hole, the combination with a single conductor cable having a plurality of electrodes suspended in the bore hole thereby of a source of alternating current at the surface of the ground connected to the conductor of said cable for causing alternating current to flow through fluid in the bore hole and through the earth formations, recording circuits at the surface of the ground for recording signals coming up the conductor of said cable, a matching section for impressing distinguishable signals upon the conductor of said cable and a plurality of units for converting alternating current potentials impressed upon certain of said electrodes into frequency modulated signals, each of said units consisting of a resistance tube modulator circuit for converting changes in alternating current potential into changes in resistance, an oscillator circuit for generating carrier waves connected to said resistance tube modulator circuit and a buffer amplifier connecting said oscillator circuit to said matching section, the arrangement being such that changes in resistance in the modulator circuit modulate the frequency of the carrier waves of said oscillator circuit.

4. In an electrical system for making simultaneously a short spaced resistivity log and a long spaced resistivity log of earth formations along a bore hole, the combination with a single conductor cable having two current electrodes and a plurality of pick-up electrodes suspended in the bore hole thereby, of a source of alternating current at the surface of the ground connected to the conductor of said cable for causing alternating current to flow between said current electrodes through fluid in the bore hole and through the earth formations, recording circuits at the surface of the ground for recording signals coming up the conductor of said cable, a matching section for impressing distinguishable signals upon the conductor of said cable and two units, one for each resistivity log, for converting the alternating current potential impressed upon short spaced pick-up electrodes and the alternating current potential impressed upon long spaced pick-up electrodes as the result of flow of current between said current electrodes, into frequency modulated signals which are supplied to said matching section, each of said units having an oscillator for generating carrier waves and a circuit for modulating the frequency of the carrier waves in accordance with variations in the amplitude of said alternating current potentials.

5. In an electrical system for making simultaneously a short spaced resistivity log and a long spaced resistivity log of earth formations along a bore hole, the combination with a single conductor cable having two current electrodes and a plurality of pick-up electrodes suspended in the bore hole thereby, of a source of alternating current at the surface of the ground connected to the conductor of said cable for causing alternating current to flow between said current electrodes through fluid in the bore hole and through the earth formations, recording circuits at the surface of the ground for recording signals coming up the conductor of said cable, a matching section for impressing distinguishable signals upon the conductor of said cable and two units, one for each resistivity log, for converting the alternating current potential impressed upon short spaced pick-up electrodes and the alternating current potential impressed upon long spaced pick-up electrodes as the result of flow of current between said current electrodes, into frequency modulated signals which are supplied to said matching section, each of said units consisting of a resistance tube modulator circuit for converting changes in amplitude of said alternating current potential into changes in resistance, an oscillator circuit for generating carrier waves therein connected to said resistance tube modulator circuit and a buffer amplifier connected to said oscillator circuit and said matching section, the arrangement being such that the changes in resistance occurring in each resistance tube modulator circuit modulate the frequency of the carrier waves of said oscillator circuit.

6. In an electrical well logging system, the combination with an electrical cable and electrodes having alternating current potentials impressed thereon of an electrode assembly having therein a signal receiving circuit connected to certain of said electrodes for converting changes in alternating current potential thereon into changes in resistance, an oscillator circuit for generating carrier waves so connected to said signal receiving circuit that the changes in resistance therein modulate the frequency of the carrier waves, a buffer amplifier connected to said oscillator circuit for amplifying the carrier waves so modulated and a matching section for impressing the amplified carrier waves upon a conductor of said cable.

WALTON J. GREER.

REFERENCES CITED

The following references are of record in the file of this patent:

UNITED STATES PATENTS

| Number | Name | Date |
|---|---|---|
| 2,321,269 | Artzt | June 8, 1943 |
| 2,364,957 | Douglas | Dec. 12, 1944 |
| 2,398,761 | Aiken | Apr. 23, 1946 |
| 2,415,364 | Mounce | Feb. 4, 1947 |
| 2,436,563 | Frosch | Feb. 24, 1948 |